United States Patent Office 2,988,576
Patented June 13, 1961

2,988,576
METHYLATION OF AROMATIC HYDROCARBONS
William D. Schaeffer, Pomona, and Art C. McKinnis, Long Beach, Calif., assignors to Union Oil Company of California, Los Angeles, Calif., a corporation of California
No Drawing. Filed Aug. 24, 1959, Ser. No. 835,454
14 Claims. (Cl. 260—668)

This invention relates to new methods for adding one or more ring methyl groups to aromatic hydrocarbons containing at least one unsubstituted ring carbon atom. Briefly, the method comprises subjecting the aromatic hydrocarbon to amidomethylation with an N-methylolamide to effect addition to the aromatic ring of one or more amidomethyl groups ($RCO-NHCH_2-$), and then subjecting the amidomethylated product to hydrogenative scission to cleave the amide groups at the N—C bond nearest the aromatic ring, thereby leaving ring methyl groups on the aromatic nucleus in place of the amidomethyl groups.

As a prime example, the invention includes a two-step process for the manufacture of durene, wherein pseudocumene is first subjected to amidomethylation with an N-methylolamide, and the amidomethylated pseudocumene is then subjected to hydrogenative scission to produce durene, and to regenerate the amide corresponding to the N-methylolamide employed. The regenerated amide is then recovered and reacted with formaldehyde to regenerate the N-methylolamide for reuse in the amidomethylation step. The principal reactions may be summarized as follows:

(1)
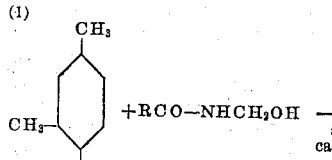

(2)
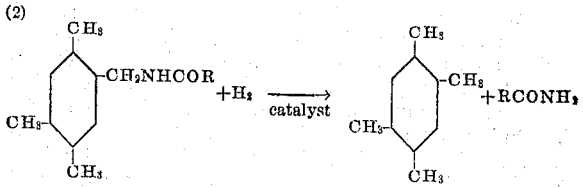

wherein R may be any nonreactive, compatible residue.

Durene is a hydrocarbon which, because of its symmetry, is of great potential interest as a raw material in the chemical industries. It may for example be converted to a symmetrical tetracarboxylic acid by oxidation, and this acid in turn is useful for the preparation of interesting polymeric esters, amides and the like. For these reasons and others there is much current interest in devising practical and economical methods for obtaining durene in pure form. It is relatively easy to prepare durene contaminated with other isomers, but such mixtures are difficult to purify, and are of little interest as raw materials for the production of polymers.

It might appear that conventional alkylation of pseudocumene by acid-catalyzed methylation would yield durene as the principal product. In general this is true, but conventional alkylation procedures also result in the formation of other tetramethylbenzenes, as well as pentamethylbenzene. Moreover, most alkylation procedures, especially when employed to introduce a methyl group, will also cause extensive isomerization and transalkylation to occur. This results in a product containing all manner of homologs and isomers of durene, and it is possible to isolate durene therefrom only in low yields and/or purity.

In many other instances, the process of this invention is highly desirable for introducing one or more ring methyl groups in selected positions of aromatic hydrocarbons. The principal advantage lies in the ease with which the amidomethyl group can be introduced into the ring, thus avoiding isomerization, and allowing the maximum normal orienting influence of any hydrocarbon groups already on the ring to take effect. As a result, the amidomethyl groups enter the ring selectively in positions para- and ortho- to existing ring substituents. Often, as where an existing substituent is relatively bulky such as a tertiary alkyl or iso-alkyl group, the amidomethylation is even more selective in the para position due to steric hinderance in the ortho positions. Thus, tert-butyl benzene or isopropyl benzene (cumene) can be amidomethylated very selectively in the para position.

When one amidomethyl group enters the ring, it also exerts an ortho, para- (mainly para-) orienting influence on any additional entering amidomethyl groups. Hence, after benzene is mono-amidomethylated, the second amidomethyl group enters almost exclusively in the para position.

In the mono-amidomethylation of toluene to produce xylenes, an important advantage lies in the fact that only ortho- and para-isomers are formed. The elimination of the meta-isomer renders the separation of the resulting xylene mixture by fractional distillation very simple, since o-xylene boils about 6° C. higher than p-xylene.

The invention also envisages a highly desirable alternative method for the manufacture of durene from p-xylene, m-xylene, or a mixture of the two. Both of these xylene isomers yield almost exclusively 1,2,4,5 isomers upon di-amidomethylation, all of which yield durene upon hydrogenation. The following table presents these and other advantageous conversions which may be effected herein:

TABLE 1

| Aromatic Hydrocarbon | Amidomethylated Product | Final Hydrogenation Product |
|---|---|---|
| 1. Benzene | p-diamidomethyl benzene. | p-xylene. |
| 2. Toluene | p-amidomethyl toluene. | p-xylene. |
|  | o-amidomethyl toluene. | o-xylene. |
| 3. Cumene | p-amidomethyl cumene. | p-cymene. |
| 4. p-xylene | 2-amidomethyl-p-xylene. | pseudocumene. |
| 5. p-xylene | 2,5-diamidomethyl-p-xylene. | durene. |
| 6. m-xylene | 1-amidomethyl-2,4-dimethyl benzene. | pseudocumene. |
| 7. m-xylene | 1,5-diamidomethyl-2,4-dimethyl benzene. | durene. |
| 8. Pseudocumene | 1,2,4-trimethyl-5-amidomethyl benzene. | durene. |
| 9. {p-xylene | 2,5-diamidomethyl-p-xylene. | } durene. |
| {m-xylene | 1,5-diamidomethyl-2,4-dimethyl benzene. | |
| 10. Naphthalene | 1-amidomethyl naphthalene. | 1-methyl naphthalene. |
|  | 2-amidomethyl naphthalene. | 2-methyl naphthalene. |
| 11. Diphenyl | p-amidomethyl diphenyl. | p-methyl diphenyl. |
| 12. Diphenyl | p,p'-di(amidomethyl) diphenyl. | p,p'-dimethyl diphenyl. |
| 13. Tetralin | 5-amidomethyl tetralin. | 5-methyl tetralin. |
|  | 6-amidomethyl tetralin. | 6-methyl tetralin. |

It is a principal object of this invention to provide methods for converting pseudocumene, p-xylene and/or m-xylene to durene in high purity and good yields. The over-all object is to provide an economical method for introducing ring methyl groups into aromatic hydrocarbons without forming an unmanageable mixture of isomers and homologs. A more specific object is to provide means for introducing a methyl group selectively into the 5-position of pseudocumene, without employing conditions severe enough to result in isomerization or transalkylation. Another specific object is to provide a cyclic process wherein substantially all of the organic moieties of the amidomethyl groups introduced onto the aromatic ring may be recovered for reuse in the amidomethylation step. Other objects and advantages of the invention will be apparent from the description which follows.

The procedural aspects of the invention may be illustrated graphically by the following flow diagram:

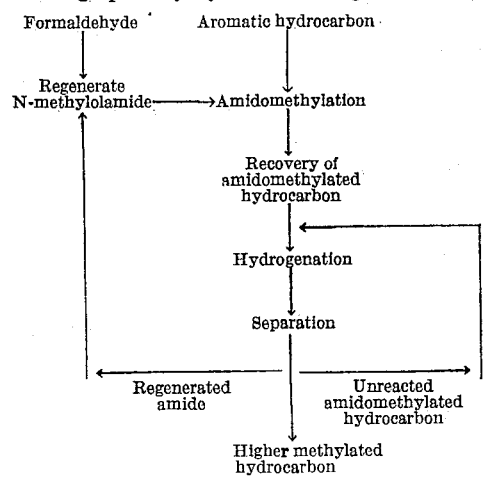

Suitable aromatic hydrocarbons which may be amidomethylated herein include benzene, naphthalene, anthracene, phenanthrene, diphenyl, diphenylmethane, triphenylmethane, toluene, ethylbenzene, cymene, cumene, p-xylene, m-xylene, o-xylene, pseudocumene, p-ethyl toluene, m-ethyl toluene, o-ethyl toluene, mesitylene, hemimellitene, p-diethylbenzene, m-diethylbenzene, o-diethylbenzene, 2-ethyl-p-xylene, 5-ethyl-m-xylene, 4-ethyl-o-xylene, durene, isodurene, n-dodecyl benzene, α-methyl naphthalene, β-methyl naphthalene, 1,5-dimethyl naphthalene, 1,4,5,8-tetramethyl naphthalene, tetralin, and the like. Mixtures of such compounds may also be employed. In general, any monocyclic or polycyclic aromatic or alkyl-aromatic hydrocarbon containing at least one active ring hydrogen atom may be employed.

Suitable catalysts for the amidomethylation step include in general any compatible acid, for example sulfuric acid of strength between about 20% and 100%, liquid hydrofluoric acid, hydrochloric acid, trifluoroacetic acid, toluene sulfonic acid, benzene sulfonic acid, methane sulfonic acid, and the like. The preferred catalysts comprise 20–100% sulfuric acid, liquid HF, trifluoroacetic acid, and the alkane sulfonic acids, e.g. methane sulfonic acid, ethane sulfonic acid, propane sulfonic acid, butane sulfonic acid, and the like. Any of these preferred catalysts may be used in admixture with a solvent such as acetic acid, dioxane, dialkyl sulfones, and the like. When sulfonic acids are employed, a highly advantageous system consists of acetic acid plus the sulfonic acid. For example, mixtures consisting of 10 to 60% by volume of methane sulfonic acid and 40 to 90% acetic acid have been found to be highly advantageous. Mixtures of hydrofluoric acid with acetic acid are also highly useful, but liquid HF itself forms a good solvent for the reaction mixture.

A useful variation of sulfonic acid catalysts comprises sulfonated synthetic resins such as sulfonated phenol-formaldehyde resins, known in the art under trade names such as Amberlite IR 120. These catalysts are preferably employed in admixture with acetic acid or other acidic solvents.

The amidomethylation is normally conducted in the liquid phase at moderate temperatures of e.g. 0–200° C. Where monoamidomethylation is desired it is preferred to use a slight mole excess of aromatic hydrocarbon, as the excess hydrocarbon is normally easier to recover than excess N-methylolamide. Where di-aminomethylation is desired it is preferred to use substantially two moles of N-methylolamide per mole of hydrocarbon. Three or four moles of N-methylolamide are used to obtain tri- and tetra-amidomethylated products, respectively. To effect the reaction, the desired reactants plus the catalyst are simply agitated together for the required length of time until the reaction is complete. In a preferred modification, the N-methylolamide is added gradually to the hydrocarbon-catalyst mixture, in order to avoid side reactions as far as possible. This modification is particularly desirable when higher temperatures are employed, which sometimes tend to cause two molecules of the N-methylolamide to react with the elimination of water and the formation of a diamido ether, or a methylene bis-amide.

When the amidomethylation reaction is completed, the amidomethylated hydrocarbon is ordinarily recovered by simply distilling off unreacted hydrocarbon, solvent, and catalyst, if a volatile catalyst system is employed. Where non-volatile catalysts are used, other separation methods such as solvent extraction, may be used. Where sulfuric acid is employed, the reaction mixture may be quenched in water to precipitate the amidomethylated hydrocarbon and unreacted hydrocarbon. The aqueous acid is then separated and reconcentrated for reuse, and the organic phase is distilled to recover unreacted hydrocarbon.

Certain of the aromatic hydrocarbons disclosed above are more susceptible to amidomethylation than others. For example the fused-ring aromatics, especially when substituted by an alkyl group, are much more reactive than the alkyl benzene hydrocarbons. Benzene itself is the most difficult member to amidomethylate. Hence, the reaction conditions, i.e. temperature and/or acid strength of the catalyst should be highest in the case of benzene, intermediate in the case of alkyl benzenes, and lowest in the case of fused-ring aromatic hydrocarbons.

In the mono-amidomethylation of pseudocumene it is preferred to employ a mole-excess of the hydrocarbon in order that the N-methylolamide may be completely consumed. The excess pseudocumene is more readily recoverable from the reaction mixture than would be an excess of N-methylolamide. Preferred ratios of pseudocumene/N-methylolamide range between about 1:1 and 2:5, but other proportions may be used.

The more active catalysts such as liquid HF, trifluoroacetic acid, or methane sulfonic acid, are preferably employed at temperatures between about 20° and 100° C. Optimum temperatures for the less active catalysts may range between about 50° and 150° C. Under these conditions of temperature and catalyst, the reaction will ordinarily be completed in about 20 minutes to 12 hours.

The N-methylolamides used herein are ordinarily prepared by reacting a carboxylic acid amide with formaldehyde or paraformaldehyde, as follows:

(3) 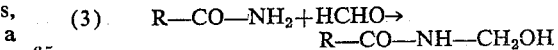

wherein R may be any compatible residue. This preparation is well known and hence need not be described in detail.

Suitable amidomethylating agents to be used herein include in general any N-methylolamide which is free of interfering functional groups. Such agents may be designated by the formula:

wherein R may be another —NR'—CH$_2$OH group, hydrogen, methyl, ethyl, propyl, isopropyl, butyl, isobutyl, hexyl, dodecyl, phenyl, tolyl, or any such alkyl or aryl group substituted with noninterfering functional groups; and R' may be hydrogen, methyl, ethyl, propyl, isopropyl, butyl, isobutyl, hexyl, dodecyl, phenyl, tolyl, formyl, acetyl, propionyl, or any such alkyl, aryl or acyl group substituted with noninterfering functional groups. Noninterfering functional groups include for example carboxyl, carbalkoxyl, halogen, and the like, while interfering functional groups include hydroxyl, sulfohydryl, amino, alkenyl, alkinyl and the like. In any of the foregoing permutations, the terminal ends of the R and R' radicals may be joined together to form a cyclic amide or imide.

Suitable examples of operative amidomethylating agents include N-methylol formamide, N-methylol acetamide, N-methylol propionamide, N-methylol-N-methyl formamide, N-methylol-N-methyl acetamide, N-methylol benzamide, N-methylol diactamide, N-methylol phthalimide, N-methylol succinimide, bis methylol urea, 2,5-diketopiperazine, and the like. The preferred class of N-methylolamides is represented by the above formula wherein R and R' are hydrogen or a lower alkyl radical having from 1 to about 6 carbon atoms. In all cases, it is preferred to use an N-methylolamide wherein the R and R' groups are nonreactive during the hydrogenation reaction.

The hydrogenation step may be carried out using techniques commonly known in the art. The conditions of temperature and pressure to be used will depend to a large extent upon the activity of the catalyst employed. Where highly active hydrogenation catalysts such as Raney nickel are employed, temperatures of about 100° to 250° C. will ordinarily be used at pressures of about 200–5,000 p.s.i.g. Such conditions are effective in general where finely divided metallic hydrogenation catalysts are employed such as nickel, cobalt, platinum, palladium, rhodium, copper and the like.

Other catalysts which may be employed, preferably under somewhat more severe conditions, include in general the transitional metal oxides or sulfides, or other compounds thereof. In particular, the oxides and/or sulfides of the group VIB and group VIII metals, or combinations thereof may be employed, e.g. nickel oxide, cobalt oxide, molybdenum oxide, etc. Suitable conditions include temperatures of about 150°–400° C., and pressures between about 500 and 10,000 p.s.i.g. The preferred temperatures lie between about 200° and 350° C.

Ordinarily the hydrogenation is carried out in liquid phase in the presence of a solvent or dispersing medium such as methanol, ethanol, isopropanol, cyclohexane, acetic acid, kerosene, or other materials inert to hydrogenation under the conditions employed. Agitation of the mixture during hydrogenation is desirable in most cases to speed up the reaction.

Following the hydrogenation step, the products are ordinarily separated by distillation. The hydrocarbon product, and the solvent or dispersing medium are generally recovered as the more volatile products. The amide, which is regenerated as indicated in Equation 2 above, may be recovered from any unreacted amidomethylated hydrocarbon by solvent extraction with water (the amide generally being more soluble in water), or by use of other selective solvents. It is preferred however to employ an amide which is also volatile and may be recovered overhead, e.g. formamide, acetamide, propionamide, or the like. Obviously, it will be desirable to select the amide and the solvent or suspending medium so that the boiling points of the components of the reaction mixture will be sufficiently widely separated to permit ready separation by distillation. But, it is not intended to exclude other methods for resolving the products.

The amide recovered from the separation step 2-a may then be reacted with formaldehyde to regenerate the desired N-methylolamide. Alternatively, the regenerated amide plus formaldehyde may be added directly to the amidomethylation step, and the formation of the N-methylolamide will then proceed concurrently with the amidomethylation reaction.

The following examples are cited to illustrate certain modifications of the invention but are not intended to be limiting in scope.

*Example I*

*Amidomethylation of pseudocumene.*—To a small flask equipped with an air condenser was added 60 ml. of trifluoroacetic acid catalyst. To the acid was then added 17.8 grams (0.2 mole) of N-methylolacetamide and a slight stoichiometric excess (about 0.25 mole) of pseudocumene. The resulting solution was then allowed to stand overnight at room temperature. At the end of the contact period the reaction mixture was poured into a cold dilute aqueous caustic soda solution. The precipitated solid was recovered by filtration and allowed to air dry at room temperature. The product consisted of substantially pure 1,2,4-trimethyl 5-acetamidomethylbenzene. The yield was essentially quantitative.

*Example II*

*Reduction of acetamidomethylated pseudocumene.*—To a 300 ml. bomb was charged 10 grams of the acetamidomethylated pseudocumene produced in Example I, 10 grams of Raney nickel and 100 ml. of methanol. The mixture was heated to 180° C. and pressured with hydrogen to 2000 p.s.i.g. The bomb was then shaken at this temperature for two hours, then cooled to room temperature, and the excess hydrogen vented. The reaction mixture was transferred to a distillation setup and diluted with 100 ml. of water. After distilling off the methanol there followed a water-hydrocarbon azeotrope which was collected, and the hydrocarbon phase extracted therefrom with hexane. Evaporation of the hexane gave a white solid having the characteristic odor of durene, and a melting point of 77–79° C. (durene M.P. 80° C.). The yield of durene, based on acetamidomethylated pseudocumene converted, was in excess of about 90%.

There remained in the distillation pot a steam-involatile fraction which proved to be a mixture of unreacted acetamidomethylated pseudocumene and acetamide. The acetamide is quantitatively recoverable by distillation, preferably at reduced pressures. None of the products of hydrogenation were found to contain ammonia or amines, thus showing that the amide group remained stable during hydrogenation.

*Example III*

The procedure of Example I is repeated, employing as reactants 0.2 mole of pseudocumene, and 0.12 mole of bis-methylol urea, and using as catalyst 50 ml. of sulfuric acid plus 50 ml. of glacial acetic acid. The resulting amidomethylated product, which is obtained in substantially quantitative yields, is N,N'-di-(2,4,5-trimethylbenzyl) urea.

This product is then suspended in methanol and subjected to hydrogenation at 3000 p.s.i.g. in the presence of a 20% molybdenum oxide–80% alumina catalyst at a temperature of about 220° C. After a one-hour reaction period, the mixture is shaken with water to dissolve out urea and methanol, and the remaining insoluble material is subjected to distillation to recover 99% pure durene overhead, leaving as bottoms the catalyst plus unreacted N,N'-di-(2,4,5-trimethylbenzyl) urea.

The aqueous solution from the extraction is then distilled to recover first the methanol, then water, leaving as residue substantially pure urea. The urea may then be reacted with formaldehyde to regenerate the bis methylol urea.

Example IV

*Di-amidomethylation of p-xylene.*—Several runs were carried out in which p-xylene was amidomethylated using sulfuric acid catalysts of varying strength. In each case, 80 ml. of the acid catalyst mixture, 10.6 gms. (0.1 mole) of p-xylene, and 17.8 gms. (0.2 mole) of N-methylolacetamide were placed in a 250 ml. flask, and stirred at 30° C. for one hour. The reaction mixture was then poured slowly into an excess of water and crushed ice, and the solid phase which separated was filtered off, washed and dried. The product in all cases was 2,5-diacetamidomethyl-p-xylene. The yields were as follows:

TABLE 2

| Run No. | Vol. percent $H_2SO_4$ | Percent Yield a |
| --- | --- | --- |
| 1 | 100 | 0 |
| 2 | 90 | 44 |
| 3 | 80 | 51 |
| 4 | 70 | b 85 |
| 5 | 60 | 36 | a Based on N-methylolacetamide.
b Upon repeating this run, a 90.5% yield was obtained.

The foregoing demonstrates that substantially equimolar mixtures (run No. 4) of water and sulfuric acid are much superior to other ratios.

*Hydrogenation of product.*—The product from run No. 4 above is subjected to hydrogenation at 3,000 p.s.i.g. and 275° C., using a 3% CoO, 9% $MoO_3$ catalyst supported on activated alumina. Work-up of the product as described in Example II gives a substantial yield of durene.

Example V

Another amidomethylation run was carried out under the conditions of Example IV, using equi-molar quantities of toluene and N-methylolacetamide, and 80 ml. of 70% sulfuric acid. After 1 hour, a 54% yield of mono (acetamido methyl) toluene was obtained. Using 80% $H_2SO_4$–20% $H_2O$, the yield was 58%. In each case, the amidomethylated product was composed wholly of the ortho- and paraisomers.

*Hydrogenation of o- and p-acetamidomethyl toluene.*—
Upon subjecting the mixed amidomethylated toluenes of this example to hydrogenation under the conditions of Example II, a xylene mixture is obtained which consists almost wholly of the ortho- and para-isomers.

Example VI

*Amidomethylation of naphthalene.*—To a 250 ml. flask was added 40 ml. of $H_2SO_4$, 40 ml. of $H_2O$, 1 gm. of sodium dodecylbenzene sulfonate (dispersant), and 12.8 gms. (0.1 mole) of naphthalene. A total of 17.8 gms. (0.2 mole) of N-methylolacetamide was added slowly at 80–85° C., and the mixture was stirred at that temperature for 1 hour, then quenched in an excess of ice water. The solid was filtered off, washed and dried. The yield of di(acetamidomethyl) naphthalene was 93%.

Upon hydrogenating this product under the conditions of Example IV, a mixture of dimethyl naphthalenes is obtained, with very little hydrogenation of the naphthalene nucleus.

Example VII

*Amidomethylation of diphenyl.*—When Example VI is repeated without a dispersant, using 0.1 mole of diphenyl instead of naphthalene, and 80 ml. of a 50/50 mixture of sulfuric acid and acetic acid as catalyst, the yield of p,p'-di(acetamidomethyl) diphenyl is about 85%. In this case, the reaction mixture remains fluid and can be easily stirred, in contrast to the foregoing examples using water-sulfuric acid mixtures. Good results are also obtained at 50° C. using a 50/50 mixture of sulfuric acid and liquid sulfur dioxide.

Upon hydrogenating the product under the conditions of Example IV, good yields of 4,4'-dimethyl diphenyl are obtained, with some evidence of ring cleavage.

Example VIII

*Di-amidomethylation of benzene.*—About 80 ml. of a 50/40 mixture (by volume) of sulfuric acid and dioxane is placed in a 250 ml. flask and 0.1 mole of benzene is added. The mixture is brought to 90° C., and 0.2 mole of N-methylolacetamide is added slowly over a 30-minute period with good agitation. The mixture is then held at 90° C. for another 30 minutes, then quenched in an excess of water and ice. The solid is filtered off, washed and dried. Good yields of para di(acetamidomethyl) benzene are thereby obtained. Good results are also obtained when a 50/50 mixture of sulfuric acid and dimethyl sulfone is used in place of the dioxane-sulfuric acid mixture.

Upon hydrogenating this product under the conditions of Example II, good yields of p-xylene are obtained.

Example IX

A 0.1 mole portion of p-xylene was subjected to amidomethylation with 0.2 mole of N-methylolformamide, using 70% $H_2SO_4$–30% $H_2O$ and a reaction time of 0.5 hour, the conditions being otherwise the same as in Example IV. A 62.5% yield of 2,5-di(formamidomethyl)-p-xylene was obtained. An equivalent yield of 2,5-di(n-methylformamido-methyl)-p-xylene is obtained when 0.1 mole of N-methyl-N-methylolformamide is used in place of the N-methylolformamide.

Hydrogenation of either of these products yields durene.

Example X

Toluene was subjected to amidomethylation with N-methylolacetamide batch-wise under varying conditions shown in Table 3 to obtain the results therein set forth. In each case, 0.26 mole of toluene and 0.2 mole of N-methylolacetamide was used:

TABLE 3

| Run No. | Catalyst and Solvent | Wt., Gms., Catalyst and Solvent | Reaction Temp., °C. | Reaction Time, Hrs. | Percent Yield a |
| --- | --- | --- | --- | --- | --- |
| 1 | $H_2SO_4$ (Conc) | 183 | 25 | 72 | 59 |
| 2 | $CF_3COOH$ | 123 | 110 | 1 | 94.5 |
| 3 | $CCl_3COOH$ | 80 | 110 | 1.5 | 40 |
| 4 | 10% toluenesulfonic acid in $CH_3COOH$. | 80 | 110 | 3 | 50 |
| 5 | 10% p-toluenesulfonic acid in $CH_2ClCOOH$. | 80 | 110 | 2 | 34 |
| 6 | 1:1 by vol. $CH_3SO_3H$ in acetic acid. | 100 | 107 | 2 | 75 |
| 7 | 1:1 mol ratio $ZnCl_2:H_3PO_4$ sat'd with HCl. | 60 | 50 | 2 | 43 |
| 8 | Liquid HF | 80 | 80 | 1 | 68 |
| 9 | HF and acetic acid, 1/1 by weight. | 80 | 80 | 1 | 88 |
| 10 | Liquid HF | 80 | 25 | 2 | 83 | a Yield of o- plus p-acetamido toluene based on N-methylol acetamide taken. (Ratio of para/ortho isomer ranged between about 1/1 and 3/1)

This example shows that toluene may be treated under the conditions herein preferred to obtain excellent yields of ortho and para acetamidomethyl toluene, to the practical exclusion of the meta isomer. And any of the resulting products may be subjected to hydrogenation under the conditions of Examples II, III or IV to produce a simple ortho-xylene, para-xylene mixture, which may easily be resolved by distillation to obtain the pure isomers.

Results substantially similar to those described in the foregoing examples are obtained when the other N-methylolamides described herein are employed, and when other amidomethylation catalysts and hydrogenation catalysts within the purview of this disclosure are employed in place of the specific materials used in the examples.

This application is a continuation-in-part of application Serial No. 747,857, filed July 11, 1958, now abandoned.

From the foregoing it will be apparent that the process of this invention provides a novel, economical and convenient method for adding methyl groups to aromatic hydrocarbons in selected positions. It is not intended that the foregoing description should be limiting in scope except where indicated. The true scope of the invention is intended to be embraced by the following claims.

We claim:

1. A method for adding at least one ring methyl group to an aromatic hydrocarbon containing at least one unsubstituted ring carbon atom, which comprises contacting said aromatic hydrocarbon with an N-methylolamide in the presence of an acidic condensation catalyst at a temperature between about 0° and 200° C., to thereby effect amidomethylation of said aromatic hydrocarbon on at least one ring carbon atom, then subjecting the amidomethylated product to catalytic hydrogenation to effect preferential cleavage of the amidomethyl groups at the C—N bond nearest the aromatic ring, and produce (1) an alkyl aromatic hydrocarbon containing ring methyl groups in place of said amidomethyl groups and (2) an amide corresponding to said N-methylolamide, and recovering said alkyl aromatic hydrocarbon.

2. A method as defined in claim 1 wherein said aromatic hydrocarbon is selected from the class consisting of toluene, xylenes and pseudocumene.

3. A method for preparing durene which comprises contacting pseudocumene with an N-methylolamide in the presence of an acidic condensation catalyst at a temperature between about 0° and 200° C., to thereby effect amidomethylation and produce a 1,2,4-trimethyl-5-amidomethylbenzene, then subjecting said last-named product to catalytic hydrogenation to effect preferential cleavage of the C—N bond nearest the benzene ring, and to produce durene and an amide corresponding to said N-methylolamide, and separating the hydrogenation products to recover substantially pure durene.

4. A method as defined in claim 3 wherein the amide produced during said hydrogenation step is recovered, reacted with formaldehyde to regenerate said N-methylolamide, and wherein said N-methylolamide is recycled to the initial amidomethylation step.

5. A method as defined in claim 3 wherein said acidic condensation catalyst is selected from the class consisting of liquid HF, trifluoroacetic acid, alkane sulfonic acids, and sulfuric acid of strength between about 20% and 100%.

6. A process as defined in claim 3 wherein said N-methylolamide corresponds to the formula:

R—CO—NR'—CH$_2$OH wherein R and R' are selected from the group consisting of hydrogen and lower alkyl radicals having from 1 to 6 carbon atoms.

7. A continuous cyclic process for the manufacture of durene in substantially pure form, which comprises (1) contacting pseudocumene with an N-methylolamide in the presence of an acidic condensation catalyst at a temperature between about 0° and 200° C. for a time sufficient to effect amidomethylation of pseudocumene, (2) recovering a 1,2,4-trimethyl-5-amidomethylbenzene from the reaction mixture, (3) subjecting said 1,2,4-trimethyl-5-amidomethylbenzene to catalytic hydrogenation under conditions of pressure, temperature and catalyst selected to effect hydrogenative scission of the C—N bond nearest the benzene ring without substantial hydrogenation of other bonds, (4) subjecting the hydrogenation product to treatment for the recovery of durene and the free amide produced during hydrogenation, (5) reacting said free amide with formaldehyde to regenerate said N-methylolamide, and (6) recycling the product from step (5) to step (1).

8. A process as defined in claim 7 wherein said N-methylolamide corresponds to the formula:

R—CO—NR'—CH$_2$OH wherein R and R' are selected from the group consisting of hydrogen and lower alkyl radicals having from 1 to 6 carbon atoms.

9. A process as defined in claim 7 wherein said N-methylolamide is N-methylolacetamide.

10. A process as defined in claim 7 wherein said N-methylolamide is bis methylol urea.

11. A method for preparing a methylated aromatic hydrocarbon which comprises subjecting an amidomethylated aromatic hydrocarbon to catalytic hydrogenation under conditions of pressure, temperature and catalyst selected to effect hydrogenative scission of the amidomethyl groups at the C—N bond nearest the aromatic ring without substantial hydrogenation of other bonds, and recovering a methylated aromatic hydrocarbon containing ring methyl groups in place of said amidomethyl groups.

12. A process for preparing durene which comprises subjecting a 1,2,4-trimethyl-5-amidomethylbenzene to catalytic hydrogenation under conditions of pressure, temperature and catalyst selected to effect hydrogenative scission of the amidomethyl groups at the C—N bond nearest the benzene ring without substantial hydrogenation of other bonds, and recovering durene from the product.

13. A process as defined in claim 12 wherein said hydrogenation is carried out at a temperature between about 100° and 250° C., a pressure between about 200 and 5,000 p.s.i.g., and in the presence of a finely divided transitional metal hydrogenation catalyst.

14. A process as defined in claim 12 wherein said hydrogenation is carried out at a temperature between about 150° and 400° C., a pressure between about 500 and 10,000 p.s.i.g., and in the presence of a hydrogenation catalyst selected from the class consisting of the oxides and sulfides of the metals of groups VIB and VIII.

References Cited in the file of this patent

UNITED STATES PATENTS

| | | |
|---|---|---|
| 2,756,261 | Fetterly | July 24, 1956 |
| 2,837,584 | Hoff | June 3, 1958 |